Jan. 20, 1970   R. D. MILLER   3,490,568
CHANGE-SPEED TRANSMISSION FOR WEAPONS SYSTEM
Filed June 17, 1968   4 Sheets-Sheet 1

INVENTOR.
RICHARD D. MILLER,
By Forrest J. Lilley
ATTORNEY.

Jan. 20, 1970  R. D. MILLER  3,490,568
CHANGE-SPEED TRANSMISSION FOR WEAPONS SYSTEM
Filed June 17, 1968  4 Sheets-Sheet 2
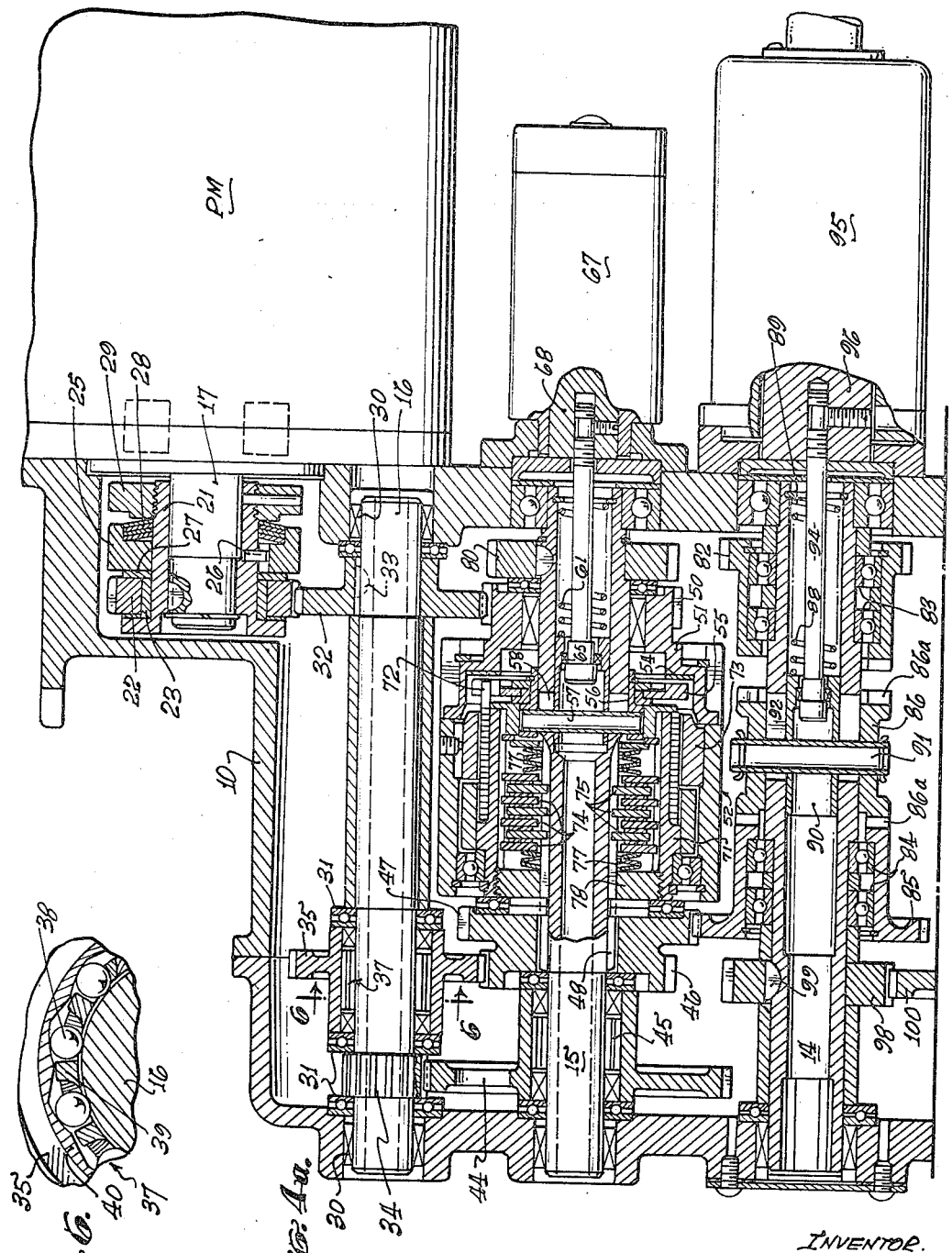
INVENTOR.
RICHARD D. MILLER,
By Forrest J. Lilly
ATTORNEY.

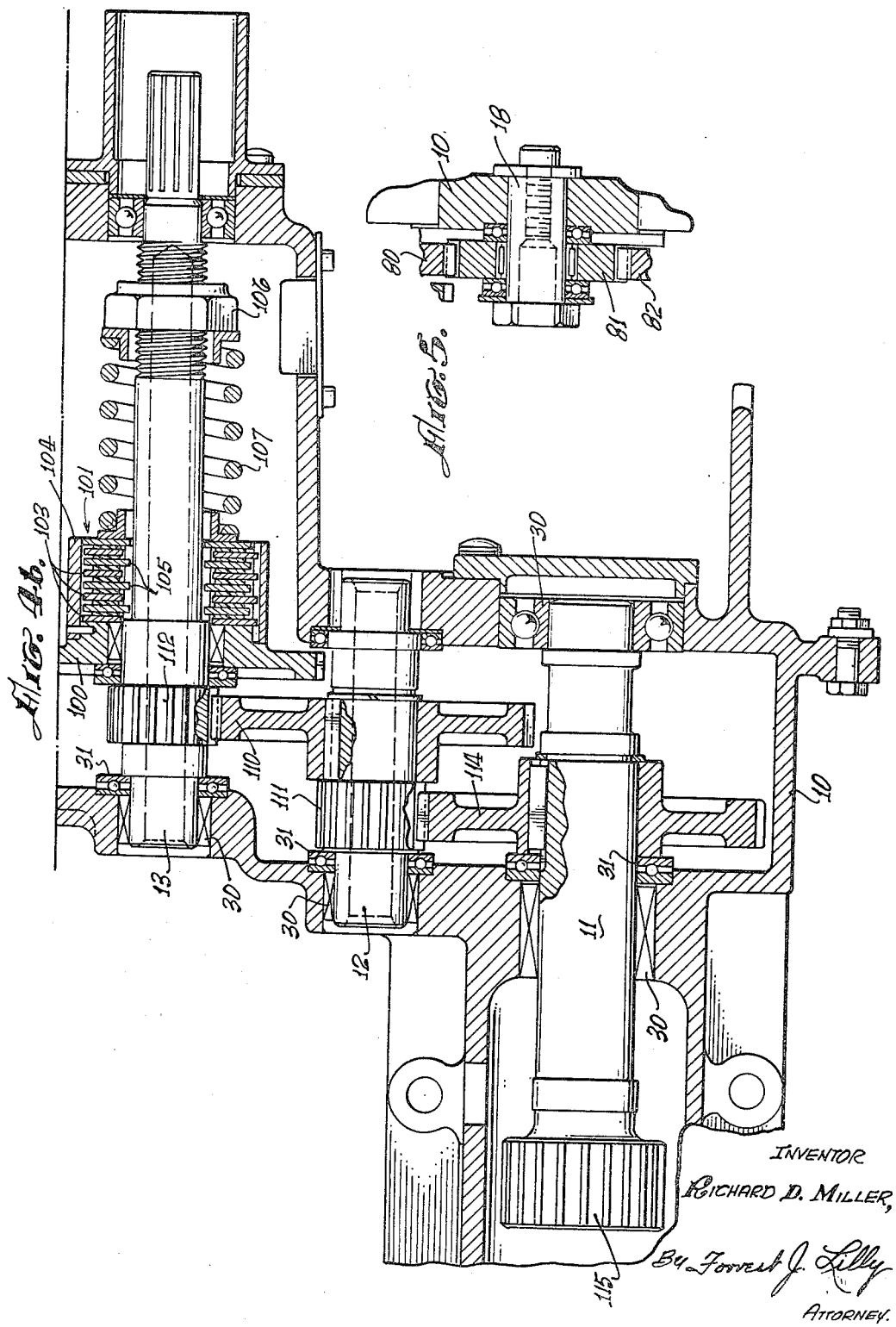

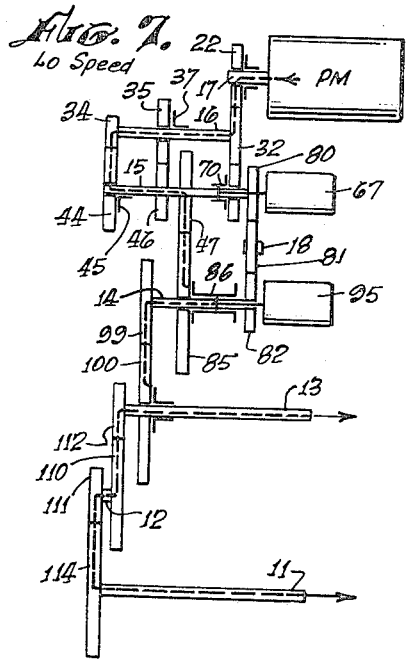
FIG. 7. Lo Speed
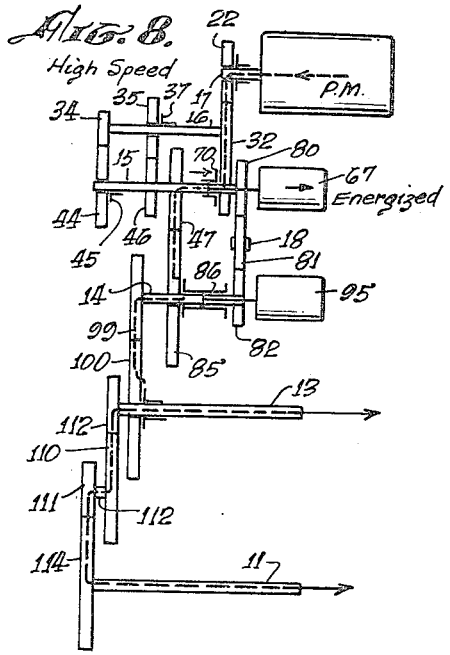
FIG. 8. High Speed
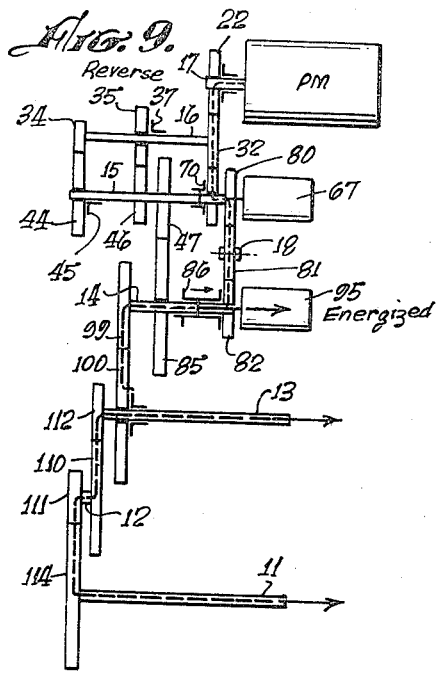
FIG. 9. Reverse
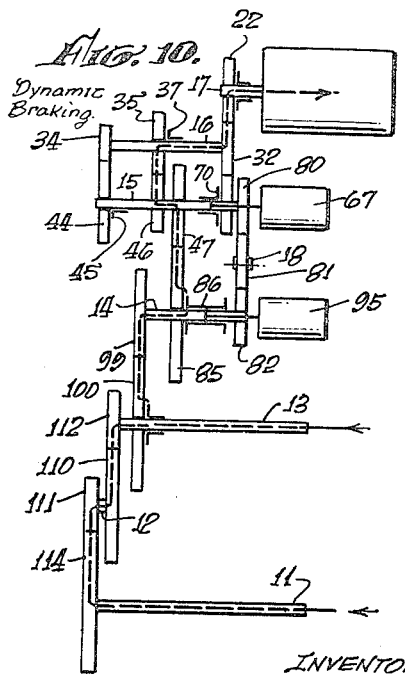
FIG. 10. Dynamic Braking
INVENTOR
Richard D. Miller,
By Forrest J. Lilly
ATTORNEY.

United States Patent Office 3,490,568
Patented Jan. 20, 1970

3,490,568
CHANGE-SPEED TRANSMISSION FOR WEAPONS SYSTEM
Richard D. Miller, West Covina, Calif., assignor to Western Gear Corporation, Lynwood, Calif., a corporation of Washington
Filed June 17, 1968, Ser. No. 737,769
Int. Cl. F16d 67/00; F16h 37/06, 3/08
U.S. Cl. 192—3.5          8 Claims

ABSTRACT OF THE DISCLOSURE

A weapons system including a rapid-fire gun served by powered ammunition supply has a transmission that meets rigorous demands of starting and stopping quickly and permitting a shift for change in speed while the gun is in full operation. The transmission is provided with reverse drive used during reloading operations and is capable of dynamic braking.

BACKGROUND OF THE INVENTION

The present invention relates generally to weapons systems in which power is employed to supply ammunition to a quick firing gun which is also power-operated; and more especially to a power transmission system for such a weapon.

Current designs of airborne machine guns utilize power-driven firing mechanism in order to obtain extremely high rates of fire. This also requires that the ammunition supply system to the gun be power operated. In such a weapons system, obviously reliability is one of the prime requisites.

However, in addition, military authorities have established severe standards of performance for such weapons systems; and this, in turn, imposes high standards on the power transmission systems. For example, the transmission is required to bring the machine gun to maximum firing rate in a very short time, approximately one-fourth of a second, in order that the gunner may bring fire to bear quickly upon a target after it is once located. Also, the transmission must decelerate the system and bring it to a complete stop within a comparable length of time in order to avoid wasting ammunition after it is decided to cease firing on a target.

The transmission is desirably one which is able to provide several different firing rates and one which permits a shift from one firing rate to another without taking the gun out of operation; in other words, a change in speed is effected while the transmission is in operation under full load. A further requirement is that the transmission be capable of a reverse drive at the output to expedite reloading the ammunition supply system.

Consequently, it becomes a general object of the present invention to provide in a weapons system a power transmission system that is rugged and reliable, and that also meets or exceeds all military specifications for performance as outlined above.

More particularly, it is an object of the present invention to provide a transmission that enables a driven load to come up to full speed or to stop in a very small length of time, typically a fraction of a second.

It is also an object of the present invention to provide a transmission that provides a choice of several selected output speeds and which can be shifted from one to another while power is being transmitted through the transmission.

It is also an object of the present invention to provide in a weapons system a power transmission that is adapted to drive both a gun and the ammunition supply thereto at a constant ratio of speeds, while driving the gun at any one of several selected firing rates.

SUMMARY OF THE INVENTION

The above and other objects of the invention are achieved by providing a transmission incorporated in a weapons system having a prime mover which provides power to the firing mechanism of a machine gun and also to means for supplying ammunition to the gun. The transmission comprises an input shaft coupled to a prime mover and a pair of output shafts, one coupled to the machine gun and the other to the ammunition supply. As a means providing a path for transmission of power between the input shaft and the two output shafts, there is provided a pair of shafts which are intercoupled by a first and a second pair of constantly meshing gears, the gears having different gear ratios, an over-running clutch at the second shaft coupling the first pair of gears to the second shaft for low speed forward drive, a friction type clutch means at the second shaft coupling the second pair of gears to the second shaft for high speed drive, the clutch means including means biasing the clutch to an inoperative position to transmit power through the first pair of gears, and means for rendering the clutch means operative to couple the second pair of gears to the second shaft in which condition the second shaft is driven at a higher speed than before and is thereby uncoupled from the first pair of gears at the over-running clutch, and power is now transmitted through the second pair of gears between the pair of shafts.

In addition, a third pair of constant mesh gears is mounted on the two shafts to intercouple them and an over-running clutch on the first shaft couples the third pair of gears to the first shaft to establish a path for transmission of power in a return direction, a condition which enables the prime mover to exert a dynamic braking force. It is preferably a multispeed electric motor since this arrangement increases the number of speed changes possible with the gear arrangement already mentioned.

In order for the transmission to change speed within the transmission while in full operation, the friction type clutch means mentioned above preferably includes a spring clutch, an auxiliary clutch operable, either manually or mechanically as by a solenoid, to actuate the spring clutch and a third clutch in series with the spring clutch which, being a friction type clutch, acts as a shock absorber to reduce the impact of shock loading on the transmission when the spring clutch is actuated.

BRIEF DESCRIPTION OF THE DRAWING

How the above objects and advantages of the present invention, as well as others not specifically mentioned herein, are achieved will be more readily understood by reference to the following description and to the annexed drawing, and in which:

FIG. 4 is a longitudinal section in two parts, 4a and 4b, taken substantially on the lines 4a—4a and 4b—4b of FIG. 3, the cutting plane passing through the axes of the several shafts of the transmission;

FIG. 5 is a fragmentary axial section generally parallel to the plane of FIG. 4a through a countershaft which is behind the plane of FIG. 4a;

FIG. 6 is a schematic of an over-running clutch, substantially on line 6—6 of FIG. 4a;

FIGS. 7, 8, 9, and 10 are diagrams illustrating the various paths of power flow through the transmission, FIGS. 7 and 8 showing forward drive at different speed ratios, FIG. 9 reverse drive of the output shafts, and FIG. 10 return flow of power with dynamic braking.

DESCRIPTION OF A PREFERRED EMBODIMENT

Figure 1:
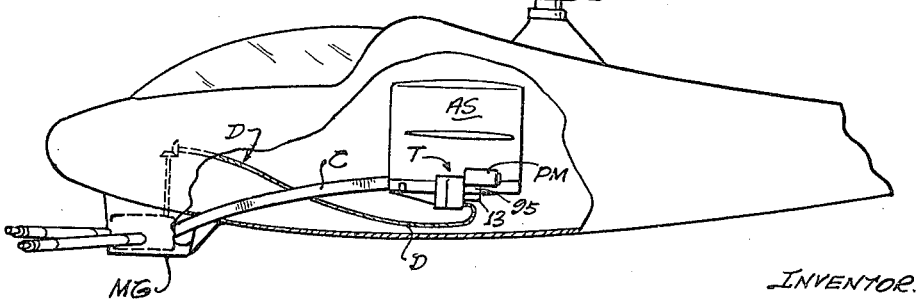
FIG. 1 is a schematic view showing the components of a weapons system carried in a helicopter and their general relationship to each other.

Referring now to the drawing, FIG. 1 shows schematically the major components of the weapons system and the relation thereto of the transmission. Typically, a machine gun MG is located in the nose of the fuselage of an aircraft, such as a helicopter gun ship. This type of machine gun has a power driven firing mechanism in order to obtain rates of fire that are controllable and higher than is possible with recoil operated guns. Power is brought to the machine gun for this purpose through a drive linkage D which may typically include, in part, a flexible shaft of which the input end is connected to the transmission T. Ammunition is brought to the weapon from a storage drum AS by means of a chute C. The details of this chute are unimportant with respect to the present invention beyond the fact that power is supplied to the ammunition supply system from transmission T, as will be more fully explained. Accordingly, the ammunition chute and drum are not illustrated in detail.

Figure 2:
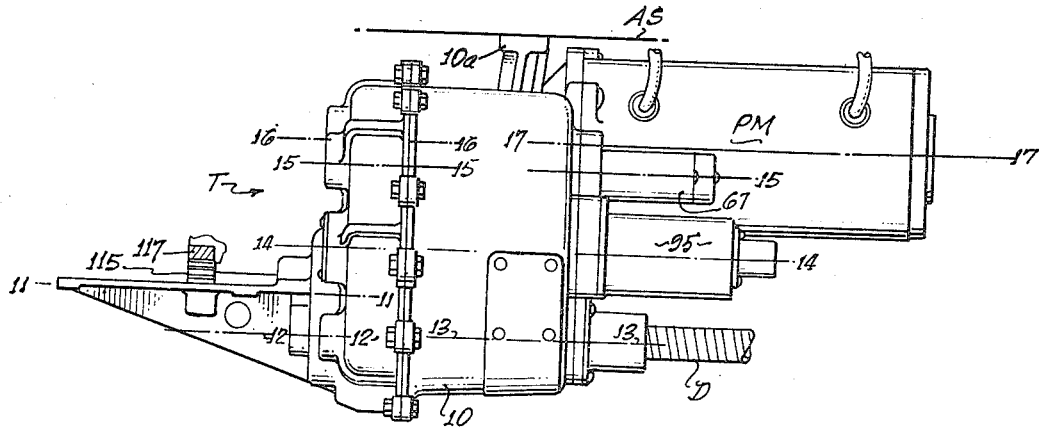
FIG. 2 is a side elevation of the transmission alone.
Figure 3:
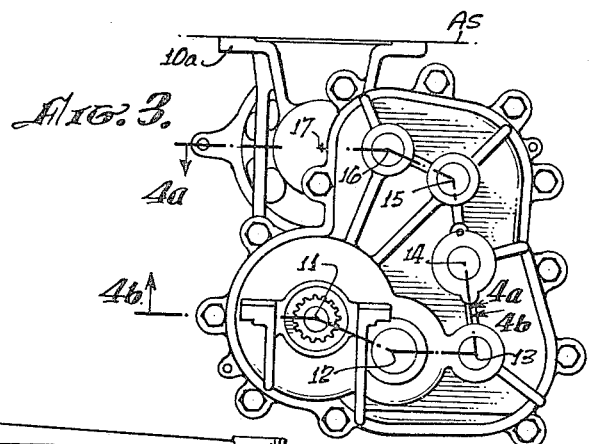
FIG. 3 is an end elevation of the transmission alone, viewed from the left of FIG. 2.

Transmission T is shown in exterior elevation in FIGS. 2 and 3 wherein it may be seen that the housing 10 of the transmission is provided with mounting bracket 10a by means of which the transmission is mounted to a stationary element of the ammunition supply drum AS. Power for the operation of the weapons system is supplied by prime mover PM mounted on transmission housing 10 and which is an electric motor, preferably of the multi-speed type.

Transmission T is of novel design and is illustrated in detail in FIGS. 4, 5, and 6. From FIG. 4, it will be seen that housing 10 provides a supporting framework in which are mounted various bearings that in turn rotatably support a plurality of parallel shafts 11–17. Shafts 11 and 13 are power output shafts while shaft 17 is a power input shaft. In addition, there is shown in FIG. 5 countershaft 18 which is fixed and which provides a support for rotatably mounting a reversing gear, as will be further described.

The transmission will now be described, taking up in sequence each of the shaft assemblies commencing with the assembly on input shaft 17 and proceeding in the direction of forward power transmission to the output shafts. Shaft 17 is the point of power input to the transmission. It may be a separate shaft but may conveniently be an extension of the rotor of the prime mover, which in this case is an electric motor PM. Shaft 17 is drivingly connected by key 20 to surrounding sleeve 21 upon which is rotatably mounted spur gear 22, there being a suitable bearing bushing 23 between the gear and sleeve.

Gear 22 is driven through a torque limiting device which comprises collar 25 slidably mounted on sleeve 21 and keyed to rotate therewith by means of pin 26. Collar 25 may be regarded as the driving member of a pair of clutch elements, the driven member being spur gear 22, friction disc 27 being interposed between these two driving and driven elements to obtain good frictional engagement for transmission of power. Collar 25 is normally urged toward disc 27 to press it into engagement with the spur gear by a plurality of Belleville spring washers 28 which are held in position by fixed collar 29 that is on sleeve 21. When input shaft 17 is an extension of the rotor of the prime mover, it is supported on bearings within the motor housing and does not require support bearings which in turn are mounted upon housing 10, as would be the case were the input shaft driven through gears from a prime mover rather than directly connected as in the illustrated embodiment.

Shaft 16 is rotatably mounted in suitable radial bearings 30 supported in housing 10 and carries also thrust bearings 31 at required locations along its length. Bearings 30 and 31 may be of any suitable design and are typical of similar bearings used to support the other shaft assemblies for rotation. Meshing with spur gear 22 is spur gear 32 on shaft 16 and keyed thereto at 33 to turn with the shaft. Also mounted on shaft 16 to be rotated thereby is spur gear 34. Adjoining gear 34 is spur gear 35 supported on shaft 16 but coupled to the shaft through an over-running or one-way clutch 37 which may be of any suitable design.

As illustrative of the type of clutch that may be used for this purpose, there is shown in FIG. 6 a cross-section of a suitable clutch interposed between shaft 16 and the hub of gear 35. This clutch comprises a plurality of rollers 38 held in annular cage 39 and in contact at their inner sides to shaft 16. The rollers and cage are inside housing 40 which surrounds the rollers and is provided with arcuate surfaces or ramps that engage the clutch rollers on the sides opposite the shaft. Thus, when gear 35 turns in one direction, clockwise in FIG. 6, rollers 38 become wedged between the ramps on clutch housing 40 and shaft 16 and drivingly couple the gear to the shaft. However, should the shaft turn faster than the gear so that the relative motion of the gear is counterclockwise with respect to the shaft, then rollers 38 move up on the ramps and instantly disengage the shaft to uncouple the gear from the shaft.

On shaft 15, parallel to shaft 16, is spur gear 44 in mesh with gear 34. Gear 44 is capable of relative rotation in one direction with respect to shaft 15 since it is coupled to the shaft by over-running clutch 45 which is a clutch of the same type as clutch 37. Next to gear 44 is a cluster gear in that two sets of spur gear teeth are placed on a single body. Teeth 46 constitute one gear meshing with the teeth of gear 35 while the adjoining series of peripheral teeth 47 constitute a second gear which, as will be described, meshes with a gear on shaft 14. This cluster gear 46, 47 is connected by a spline 48 or other similar means to shaft 15 to turn therewith.

Also mounted upon shaft 15, and capable of free relative rotation with respect thereto under selected conditions, is gear 50. Gear 50 can be selectively coupled to shaft 15 to drive the shaft by friction-type clutch means associated with gear 50, the teeth of the gear 50 being around the periphery of a portion of housing 51 of this clutch. This clutch means, generally indicated at 52, is a combination of three separate clutches which function as a unit. On the inside of housing 51 is a radial shoulder which is covered with friction disc 54 constituting the driving member of an auxiliary clutch. In cooperation with this is an opposed radial face on driven clutch disc 55 which is slidably mounted upon shaft 15, by sleeve 56. Sleeve 56 rotates with the shaft 15 by virtue of its engagement with the ends of pin 57 which extends transversely through shaft 15 at slot 58 which allows limited axial movement of the pin and sleeve with respect to shaft 15.

Shaft 15 is hollow, and inside the shaft is sleeve 60 which is normally urged to the position shown in FIG. 4a by spring 61 which bears at one end against inner sleeve 60 slidable within the shaft and at the other end against a fixed abutment, for example retainer ring 62 seated in an internal annular recess in the central bore in shaft 15.

Pin 57 can be moved to the right in FIG. 4a by a pull applied to operating rod 64 which has an enlarged inner head within sleeve 60. A bearing 65 between the head of operating rod 64 and sleeve 60 permits free relative rotation of these two members. Rod 64 can be moved manually or mechanically. It is preferred that mechanical power be applied to it in order to effect remote control; and for this purpose, solenoid 67 is mounted upon the exterior of transmission housing 10. The armature 68 of the solenoid is connected to the outer end of operating rod 64; and when the solenoid is energized, the armature moves to the right exerting a pull on operating rod 64 against biasing spring 61. This movement brings clutch disc 55 into engagement with friction disc 54 which is being rotated by gear 50.

The friction type clutch just described is an auxiliary clutch, the purpose of which is to energize or actuate a second clutch which is here provided in the form of a spring clutch. This spring clutch comprises a helical spring 70, the turns of which are formed of rectangular cross-sectional wire and are normally in contact with each other. Spring 70 is wound around and connected at one end to barrel 71. The other or outer end of spring 70 is provided with a tang 72 which is held in a radial slot in clutch disc 55. Spring 70 is confined between barrel 71 inside the turns of spring 70 and outer housing 51 having an annular liner 73 around a portion of the turns of the spring. Liner 73 is spaced from the turns of the spring, as shown in FIG. 4a, when contracted and the clutch is disengaged, thereby permitting housing 51 to rotate freely with respect to the spring clutch.

Inside barrel 71 and coupling it to shaft 15 is a plurality of clutch discs providing a third friction type clutch which serves as a shock absorber to reduce the impact of shock loading on the clutch assembly. This inner clutch mechanism comprises a plurality of discs 74 which are spline-connected or otherwise drivingly engaged with the interior of barrel 71. A second plurality of discs 75 alternating with and between discs 74 is spline-connected or otherwise drivingly connected to shaft 15. Interposed between successive discs 74 and 75 are friction discs or pads adhesively connected to one set of discs 74 or 75 in order to provide a high frictional contact between the driving and the driven elements of this clutch. Discs 74 and 75 are held in frictional driving engagement by Belleville springs 77 located at opposite ends of the disc assembly and bearing against a fixed abutment. At the open end of barrel 71, nut 78 is secured to the barrel, as by internal screw threads on the barrel, and provides an abutment for one set of Belleville spring washers 77.

When this friction type clutch means 52 is inoperative, as shown in FIG. 4, gear 50 in mesh with gear 32 rotates the outer housing freely with respect to shaft 15. When it is desired to change the gear ratio within the transmission to effect a speed change in the output shafts, solenoid 67 is energized, thereby bringing into engagement the elements 54 and 55 of the auxiliary clutch. Clutch disc 54 turning with housing 51 causes driven member 55 to turn in the same direction. Engagement with this clutch member of spring tang 72 moves the tang in a direction to unwind the turns of spring 70, thereby expanding the turns of the spring and bringing them into engagement with housing liner 73. Power is now transmitted from gear 50 through housing 51 and liner 73 to the turns of spring 70 which are loaded in compression. This force is transmitted through the spring turns to inner barrel 71 and thence through clutch discs 74 and 75 to shaft 15 to turn shaft 15. The expansion of coil 70 is very rapid with the result that high impact loading is placed upon the convolutions of spring 70. To reduce the shock, a friction clutch comprising discs 74 and 75 is placed in the path of power flow, a limited slippage occurring between the discs at the instant of loading; but the frictional engagement between the discs is adequate to pick up the load and rapidly accelerate shaft 15.

Shaft 15 is now turning at a faster rate than when it was driven through gear 44. This is because the pitch diameters of the meshing gears 34 and 44 are such as to effect a speed reduction between shafts 16 and 15 whereas the pitch diameters of gears 32 and 50 are such to effect no speed reduction. For example, the pair of gears 32 and 50 may have a 1:1 ratio whereas the gears 34 and 44 may have a 1:4 ratio. The result is that when the clutch is engaged, shaft 15 is driven at a speed approximately four times faster than when the clutch is disengaged. The higher relative speed of shaft 15 with respect to the hub of gear 44 then decouples the shaft through over-running clutch 45 from gear 44 which continues to turn at its normal speed; but shaft 15 and gear 47 now turn at a higher speed than before.

The assembly on shaft 15 also includes a gear in the reversing train, this being gear 80 which is keyed or otherwise connected to shaft 15 to turn therewith constantly. Gear 80 is continually meshed with gear 81, shown in FIG. 5, which is rotatably mounted upon fixed shaft 18 supported by housing 10. Gear 81 in turn is continually in mesh with the gear 82 which is an element of the assembly on shaft 14. As may be seen in FIG. 4a, gear 82 is rotatably mounted upon shaft 14 by radial bearings 83 and accordingly is capable of rotation relative to that shaft.

Similarly mounted upon shaft 14 by bearings 84 is spur gear 85 which is constantly in mesh with gear 47 on shaft 15. Either one of gears 85 and 82 can be coupled selectively to shaft 14 by dog clutch 86 which is slidably mounted upon shaft 14. Clutch 86 comprises a sleeve having on its opposite end faces axially projecting teeth 86a which can be selectively engaged with mating clutch teeth on the opposing end faces of the hubs of gears 82 and 85.

Dog clutch 86 is normally biased to a position in which it engages the clutch teeth on gear 85 and thereby normally couples gear 85 to shaft 14 for rotation of the shaft. The dog clutch is biased towards this position by spring 88 located within shaft 14 and bearing at one end against a fixed abutment in the form of retainer ring 89 and at the other end against sleeve 90 slidable within the shaft. The transverse pin 91 extends through sleeve 90 and a slot 92 in the wall of shaft 14 to engage clutch sleeve 86. The clutch sleeve can be shifted to the right in FIG. 4a to engage its teeth 86a with the opposing teeth on gear 82 by a pull applied to operating rod 94 located coaxially within shaft 14. The enlarged head on operating rod 94 engages a shoulder on the inside of sleeve 90, a bearing preferably being interposed between the operating rod and sleeve 90 to permit free relative rotation.

Operating rod 94 can be shifted manually if desired; but for practical purposes, the application of mechanical power remotely controlled is preferred. To effect this shift, there is provided solenoid 95 having an armature 96 which is connected to rod 94 in such fashion that when solenoid 95 is energized, the armature is moved to the right viewed in FIG. 4 and the pull applied to operating rod 94 shifts dog clutch sleeve 86 into the position in which gear 82 is coupled to shaft 14.

In the position of the parts shown in FIG. 4a, power is transmitted to shaft 14 through gear 85 in a forward direction of output drive. When gear 85 is uncoupled and gear 82 is coupled to shaft 14 by selective action of clutch 86, shaft 14 is revolved in the opposite direction because of the fact that gear 81 introduces an extra gear into the gear train between shafts 15 and 14, thereby reversing the direction of rotation of the output shafts 11 and 13.

The assembly on shaft 14 also includes spur gear 98 which is connected to shaft 14 to rotate therewith by key 99 or other similar means. Gear 98 is in constant mesh with gear 100 which is caried by shaft 13. Shaft 13 is one of the output shafts from the transmission and is connected to the machine gun by the drive which includes flexible shaft D as illustrated in FIG. 2. As safety measure, it is preferred that gear 100 be connected to shaft 13 through a yielding connection 101 which limits the torque transmitted by gear 100 to the shaft. Thus, in case the machine gun jams or output shaft 11 becomes locked for any reason, the torque limiting device at 101 yields and saves the transmission from damage or the prime mover from being burned out.

Torque limiting device 101 is a multiple disc, dry plate, friction-type clutch comprising a plurality of driven discs 103 connected to housing 104 which is rigidly attached to the hub of gear 100. Alternating with discs 103 is a series of driven discs 105 which are spline-connected or otherwise secured to shaft 13. Interposed between successive discs 103 and 105 are friction disc pads which provide adequate frictional engagement between successive discs.

The torque applied through the limiting device 101 is preferably adjustable, and this can be accomplished by movement of adjusting nut 106 which is threaded on the shaft 13. Coil spring 107 is held between compression between nut 106 and the end of the series plates of the torque limiting device 101 and the pressure applied by spring 107 to the series of plates, and hence the maximum torque developed can be adjusted by movement of nut 106.

Output shaft 11 is the low speed shaft of the two output shafts. Regardless of the speed at which the two output shafts run, the weapons system requires that the two run at a fixed ratio with respect to each other. For this purpose, speed reduction gears are interposed between shafts 13 and 11. The speed reduction gear train comprises shaft 12 on which are mounted, to rotate with the shaft, the large diameter spur gear 110 and the smaller diameter spur gear 111. The former gear meshes with gear 112 which is attached to shaft 13 while the smaller gear 111 meshes with gear 114 which is attached to shaft 11. Gears 110, 111, 112, and 114 are all connected by keys, splines, or similar means.

Low speed output shaft 11 carries drive pinion 115. This meshes with an annular face gear 117 on the ammunition supply drum which is a part of the ammunition supply system AS and is the point of power input into the system for feeding the ammunition to the machine gun.

OPERATION OF THE TRANSMISSION

Having described the construction of the novel transmission and its relationship to the other components of the weapons system, the opertaion of the transmission will now be reviewed.

Basically, the transmission provides for three major conditions or modes of drive. The normal condition or mode is forward drive in which power flows from the prime mover to both of the output shafts through one of a plurality of selected paths at a selected output speed. Forward drive is illustrated in FIGS. 7 and 8. With the power flow still in the forward direction through the transmission, the output shafts can be revolved in the reverse direction as is required for reloading the weapon. This condition is illustrated in FIG. 9. When the gun stops firing, the inertia of all moving parts causes the power flow to be in a return direction from the driven elements back to the prime mover which then is capable of dynamic braking in order to slow down the driven elements and the transmission as rapidly as possible. This return power flow is shown in FIG. 10

Forward drive is at either one of two gear ratios determined by the gear train within the transmission. The low speed ratio or low speed of the output shafts 11 and 13 is illustrated in FIG. 7. Here, the power flows from the prime mover to gear 22. The shock of starting is absorbed by slippage at friction disc 27. This torque limiting device permits the prime mover, which has an extremely high starting torque, to come up to speed while the inertia of the transmission and the weapon may cause a slight lag in the bringing up to speed the moving parts of the transmission and the weapon. This time lag is of the order of a minor fraction of a second. Power then flows through the gear train 22, 32 to shaft 16 and thence through gear 34 to gear 44 on shaft 15. Gear 34 is always directly connected to the shaft, but gear 35 is uncoupled from shaft 16 by over-running clutch 37. Gear 32 also meshes with gear 50 on shaft 15; but gear 50 is uncoupled from that shaft by spring clutch 70 in the released position. As will become apparent, the different output speeds caused by the difference in gear ratios within the transmission occur because of the difference in gear ratios of the two gear trains 34–44 and 32–50.

Since the gear train 34–44 has the higher numerical ratio, for example 1:4, at low speed, gear 44 is coupled to shaft 15 through over-running clutch 45 and power is transmitted then through gear 47 to gear 85 on shaft 14. Shaft 14 is coupled by dog clutch 86 to shaft 14 for forward drive.

From shaft 14, power flows through the gear train 99, 100 to the high speed output shaft 13 which revolves in the direction referred to herein as the forward direction.

A speed reduction between shafts 13 and 11 occurs as a result of the speed reducing gear train including gears 112, 110, 111, and 114. Thus, it will be noticed that the speed ratio between the two output shafts is constant since this train of gears is continuously in mesh and both shafts revolve in the forward direction and at a fixed ratio with respect to each other.

To effect a change in output speed by change in gear ratio through the transmission gears, solenoid 67 is energized, thereby drawing pin 57 to the right and engaging clutch members 54 and 55 of the auxiliary clutch. Engagement of these two members expands the coils of spring clutch 70 into engagement with liner 73, thereby causing housing 70 to revolve at a speed determined by the speed of gear 50 which is now being driven through gear 32 from gear 22.

The ratio of the two gears 32 and 50 of the gear train between shafts 16 and 15 being numerically lower (for example 1:1) than the gear ratio between the two gears 34 and 44, shaft 15 is now driven at a higher speed than under the conditions existing for the low speed drive of FIG. 7. As illustrated in FIG. 8, power now flows through gear 50 and spring clutch to shaft 15. Shaft 15 turning at a higher speed than before uncouples gear 44 from the shaft and gear 47 drives, as before, gear 85. Gear 85 revolves in the forward direction and drives shaft 14 as long as dog clutch 86 is engaged therewith, as shown in FIG. 4a. From shaft 14, the path of power flow to the two output shafts 11 and 13 is the same as previously described. Of course, at the new gear ratio, output shafts 11 and 13 now revolve at higher speeds but still at the same speed ratio with respect to each other.

Prime mover PM is a suitable multispeed electric motor of known design, typically one having two sets of windings and two commutators so that the windings can be separately energized and the speed of its armature is either relatively high or low. Typically, the rotor speeds may have a ratio of 1:2 with respect to each other. This multispeed characteristic of the prime mover enables additional selected speeds to be developed at output shafts 11 and 13 without additional gear changes. For example, assume that in each of the foregoing examples the electric motor is revolving at its low speed. By energizing the other winding through the second commutator, the speed of the motor can be doubled. This means that the speed of all gears within the transmission is doubled and the speeds of the two output shafts 11 and 13 are doubled for either of the gear trains within the transmission gears.

The paths of power flow so far described are all in the forward drive and also forward flow of power. The transmission is capable of driving the output shafts in the reverse direction but still with a forward flow of power from the prime mover. This condition is illustrated in FIG. 9. It is achieved by shifting dog clutch 86 to the right in FIG. 4a to engage clutch teeth on the end of the hub of gear 82. The clutch is shifted by energizing solenoid 95. This shift is made after the forward drive is stopped and moving parts have come to rest. Consequently, a positive engagement type of clutch is used at this point. By shifting the clutch in this manner, gear 85 is uncoupled from shaft 14 and in its place gear 82 is coupled to the shaft.

The power flow is now through the train of gears comprising gear 27, 32, 50, shaft 15, gear 80, gear 81 (FIG. 5) to gear 82 on shaft 14. It will be seen that in this path, there is an additional gear, gear 81, introduced into the gear train and the path of power flow. The result of the additional gear is that shaft 14 is now driven in the reverse direction, while shaft 15 still revolves in the forward direction. Accordingly, the remaining gears in the train, gears 98, 100, 112, 110, 111, and 114, all now revolve in the opposite directions, and output shafts 11 and 13 likewise turn in a reverse direction but at the same relative speed ratio with respect to each other, as before.

Since the reversing action takes place between shaft 15 and the output shafts and the changes in gear ratio or prime mover speed take place upstream of the power flow from gear 80, it will be apparent that the output shafts may be driven in the reverse direction at any one of the speeds possible for the forward direction.

One of the major advantages of the present transmission is that it is capable of using the prime mover for dynamic braking, when it is desired to cease operation of the weapon. Immediately upon de-energization of the prime mover, the inertia of all moving parts, both in the weapon and in the ammunition supply system as well as in the transmission itself, continue to move them in a forward direction. However, the power flow is actually in a return path as illustrated in FIG. 10. The kinetic energy of the moving parts attached to shaft 11 flows in a return path through gears 114, 111, 110, and 112 to shaft 13 where it is combined with the kinetic energy of the moving parts connected to shaft 13. This energy flows backwardly through the transmission, assuming clutch 86 to be in the forward drive position of FIG. 4, through the train of gears 100, 99, 85, 47 to shaft 15. Since this flow of energy is slowing down shaft 15, it is uncoupled from gear 44 by over-running clutch 45 and instead the energy flows from shaft 15 to shaft 16 through a crossover gear train consisting of gears 46 and 35. Gear 35 is now coupled to shaft 16 through the one-way or over-running clutch 37 because of the relative direction of rotation of the gear and shaft. This arrangement permits flow of power in a return path between shafts 15 and 16 while gears 34 and 44 for the forward flow remain constantly in mesh. This return path for power flow now proceeds through shaft 16 and gears 32 and 27 to the rotor of prime mover PM which dynamically brakes the rotor and thus brings quickly to a stop all of the moving parts. This braking effect is extremely effective and takes the machine gun out of action in only a few milliseconds. Thus, stopping is almost instantaneous and ammunition is conserved that would otherwise be wasted by being thrown overboard.

From the foregoing description, it will be realized that the operation and construction of the transmission is characterized by constantly meshing pairs of gears. There is no sliding or other movement of pairs or sets of gears to engage and disengage to effect a change in speed. Instead, speed change is accomplished while the transmission is under load and without stopping the driven elements, in this case the machine gun and the ammunition supply.

It will be appreciated that additional speed changes can be incorporated by adding gear sets and clutches in series at appropriate locations.

To enable the gears to be maintained in constant mesh, the low speed set is coupled to a shaft by an over-running clutch; and after the shift to a high speed is accomplished, the low speed set of gears is uncoupled by the one-way clutch.

Another characteristic of the invention is multiplication of the speeds achieved by gear sets within the transmission by the number of speeds available from a multispeed motor. Thus, two motor speeds double the number of available output speeds to four while only two different speeds by changing the gears are available.

It will be apparent that various changes in the detailed construction and arrangement of the parts of the improved transmission and of the weapons system itself may occur to persons skilled in the art without departing from the spirit and scope of the present invention. Accordingly, it is to be understood that the foregoing description is considered to be illustrative of, rather than limitative upon, the invention as defined by the appended claims.

I claim:
1. A transmission comprising:
   an input shaft;
   a first output shaft;
   a second output shaft coupled to the first output shaft to rotate at a fixed ratio relative thereto; and
   means providing a path for forward transmission of power from the input shaft to the two output shafts including
   a first and a second shaft parallel to each other;
   a first and a second set of constantly meshing gears mounted on and intercoupling said shafts, the two sets having different gear ratios;
   an over-running clutch at the second shaft coupling the first set of gears to the second shaft for forward drive;
   friction type clutch means at the second shaft coupling the second set of gears to the second shaft, the clutch means including means normally biasing the clutch means to an inoperative condition to transmit power forwardly through the first set of gears; and
   means rendering the clutch means operative to couple the second set of gears to the second shaft, whereby the second shaft is uncoupled from the first set of gears at the over-running clutch and power is transmitted forward through the second set of gears.

2. The subject matter of claim 1 and also a multispeed electric motor coupled to the input shaft.

3. A transmission as claimed in claim 1 which also includes:
   a third set of constant mesh gears mounted on and intercoupling the two shafts; and
   an over-running clutch on the first shaft coupling the third set of gears to the first shaft to establish a path for transmission of power in a return direction between the two shafts.

4. A transmission as claimed in claim 3 which also includes:
   a third shaft;
   a third and a fourth gear set intercoupling the second and the third shafts, the fourth gear set including a reversing gear; and
   clutch means carried on the third shaft and movable to selectively couple the third or the fourth gear set to the third shaft whereby the rotation of the third shaft may be established in a forward or reverse direction.

5. A transmission as claimed in claim 4 which also includes:
   a train of constant mesh gears connecting the two output shafts to the third shaft to drive the output shafts at a constant speed ratio relative to each other.

6. A transmission as claimed in claim 1 that also includes:
   a train of constant mesh gears connecting the two output shafts to the second shaft to drive the output shafts at a constant speed ratio relative to each other.

7. A transmission as claimed in claim 1 in which the friction type clutch means includes:
- a spring clutch;
- an auxiliary clutch operable to actuate the spring clutch; and
- a second clutch in series with the spring clutch to absorb shock loading when the spring clutch is actuated.

8. A transmission as claimed in claim 1 that also includes friction-type torque-limiting means between the prime mover and the output shafts.

References Cited

UNITED STATES PATENTS

| | | | |
|---|---|---|---|
| 2,461,027 | 2/1949 | Bodmer | 74—359 |
| 2,711,222 | 6/1955 | Bock. | |
| 2,869,382 | 1/1959 | Klecker et al. | 74—359 X |
| 3,073,180 | 1/1963 | Lohr | 74—665 |
| 3,223,205 | 12/1965 | McCurdy. | |
| 3,394,782 | 7/1968 | Capra | 192—3.5 |

ARTHUR T. McKEON, Primary Examiner

U.S. Cl. X.R.

74—359, 665